US007218715B1

(12) United States Patent
Zuurveld et al.

(10) Patent No.: US 7,218,715 B1
(45) Date of Patent: May 15, 2007

(54) METHOD AND SYSTEM FOR SETTING UP A TELEPHONE CONFERENCE CALL IN A SWITCHED TELEPHONE NETWORK THROUGH THE INTERNET

(75) Inventors: Marco Zuurveld, Rijen (NL); Petrus Johannes Adrianus, Gilze (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 807 days.

(21) Appl. No.: 10/363,286

(22) PCT Filed: Aug. 28, 2000

(86) PCT No.: PCT/EP00/08409

§ 371 (c)(1),
(2), (4) Date: Aug. 25, 2003

(87) PCT Pub. No.: WO02/19677

PCT Pub. Date: Mar. 7, 2002

(51) Int. Cl.
*H04M 3/42* (2006.01)
*H04L 12/66* (2006.01)

(52) U.S. Cl. ............. 379/205.01; 370/352; 379/202.01

(58) Field of Classification Search ........... 379/202.01, 379/203.01, 204.01, 205.01, 207.01, 158; 370/352
See application file for complete search history.

(56) References Cited

U.S. PATENT DOCUMENTS 5,995,608 A  11/1999  Detampel, Jr. et al. ..... 379/205
6,055,232 A * 4/2000  Ward et al. .................. 370/385
6,754,709 B1* 6/2004  Gbadegesin ................ 709/227
6,874,024 B2* 3/2005  Cohen et al. ................ 709/224

FOREIGN PATENT DOCUMENTS

EP   0 836 295 A2   4/1998
EP   0 836 295 A3   4/1998
WO   PCT/EP00/08409   8/2000

OTHER PUBLICATIONS

Gibson, D. L., Pauley, D. and Willis, L., "Unattended Audioconferencing," *BT Technology Journal*, G. B., vol. 15, No. 4, Oct. 1997, pp. 26-32, XP000722031.

* cited by examiner

*Primary Examiner*—Creighton Smith

(57) ABSTRACT

Method and system for setting up connections between a plurality of telephone devices (8, 9) of a switched telephone network (1), for establishing a conference call, comprising connecting a web client terminal (18) to a web server (15, 24) of the internet (2), on request by the terminal (18) running a conference application (26) on the web server (15, 24) to serve the client terminal (18) with a web page to return a plurality of telephone numbers corresponding to respective ones of the plurality of telephone devices (8, 9), in response to receipt of the plurality of telephone numbers by the web server (15, 24) uploading the plurality of telephone numbers by the web server (15, 24) to a service control point (4) of the switched telephone network (1) thereby initiating a conference call script (10) of a service management system (6) supporting the service control point (4) for setting up said telephone connections.

8 Claims, 2 Drawing Sheets

METHOD AND SYSTEM FOR SETTING UP A TELEPHONE CONFERENCE CALL IN A SWITCHED TELEPHONE NETWORK THROUGH THE INTERNET

The invention relates to a method for setting up connections between a plurality of telephone devices in a switched telephone network for establishing a conference call.

With a known method of the above type a complicated procedure is used within the switched telephone network involving special telephone numbers and dedicated access code or operator assistance. Accordingly, with the known method setting up a conference call is time consuming and expensive in addition.

It is an object of the invention to solve the above-mentioned disadvantages.

For solving said object the invention provides a method according to claim 1.

The conference application of the web server called by the browser of the web client terminal will provide a web page which need to comprise only boxes to be filled out with telephone numbers by an operator of the terminal and a "submit" button to upload the plurality of telephone numbers of the filled out boxes to the web server. From the web server the plurality of telephone numbers are uploaded to a service control point of the switched telephone network, which as a result thereof initiates a dedicated conference Intelligent Network Service Script, which will instruct the service control point to set up the telephone connections relating to the plurality of telephone numbers.

Therefore, the method for setting up a telephone conference call according to the invention is very easy and quickly to carry out by a person who wants to initiate a conference call, without the need of special telephone numbers and special skills, and thus saving time and money.

The invention also relates to a system according to claim 8.

Figure 1:
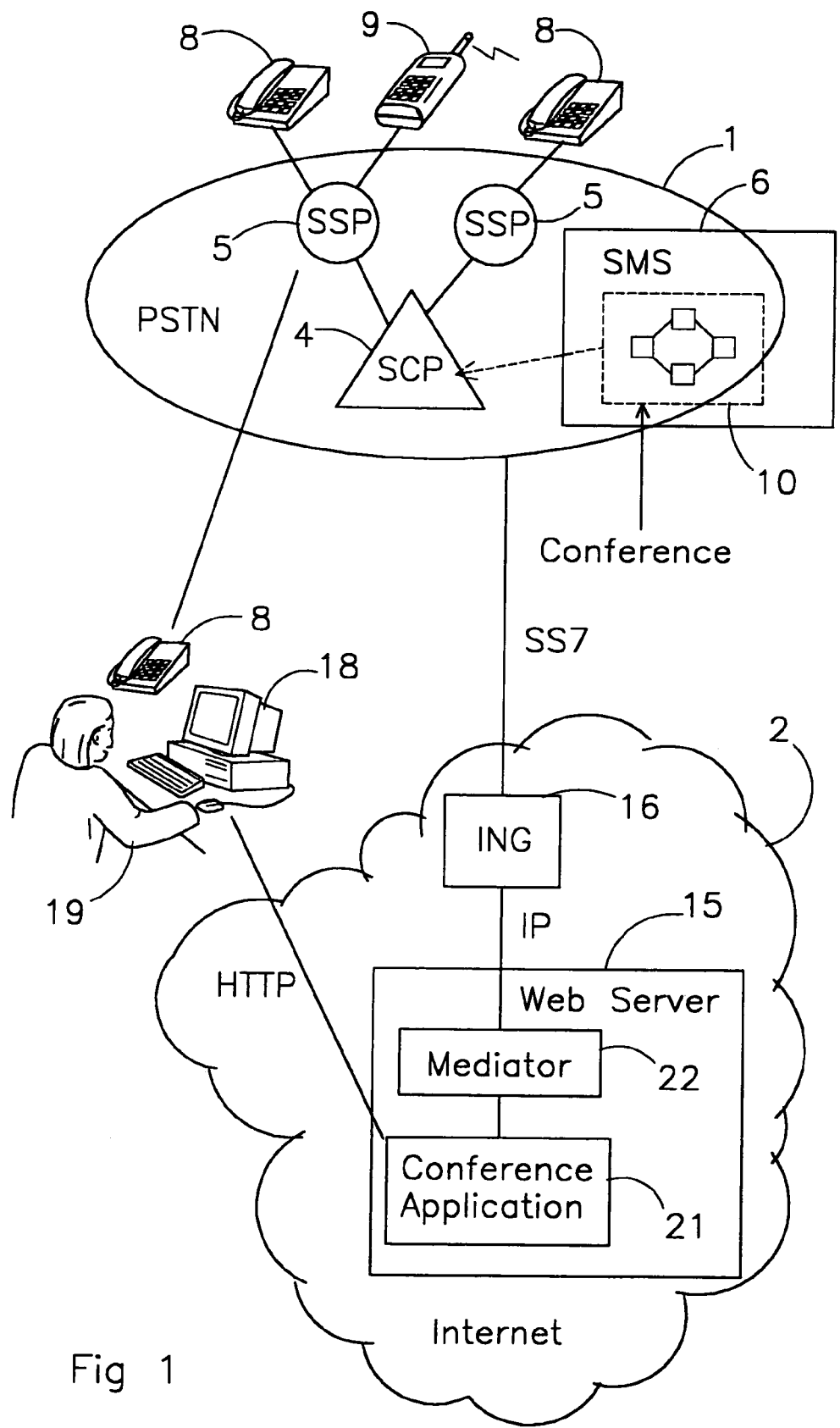
Figure 2:
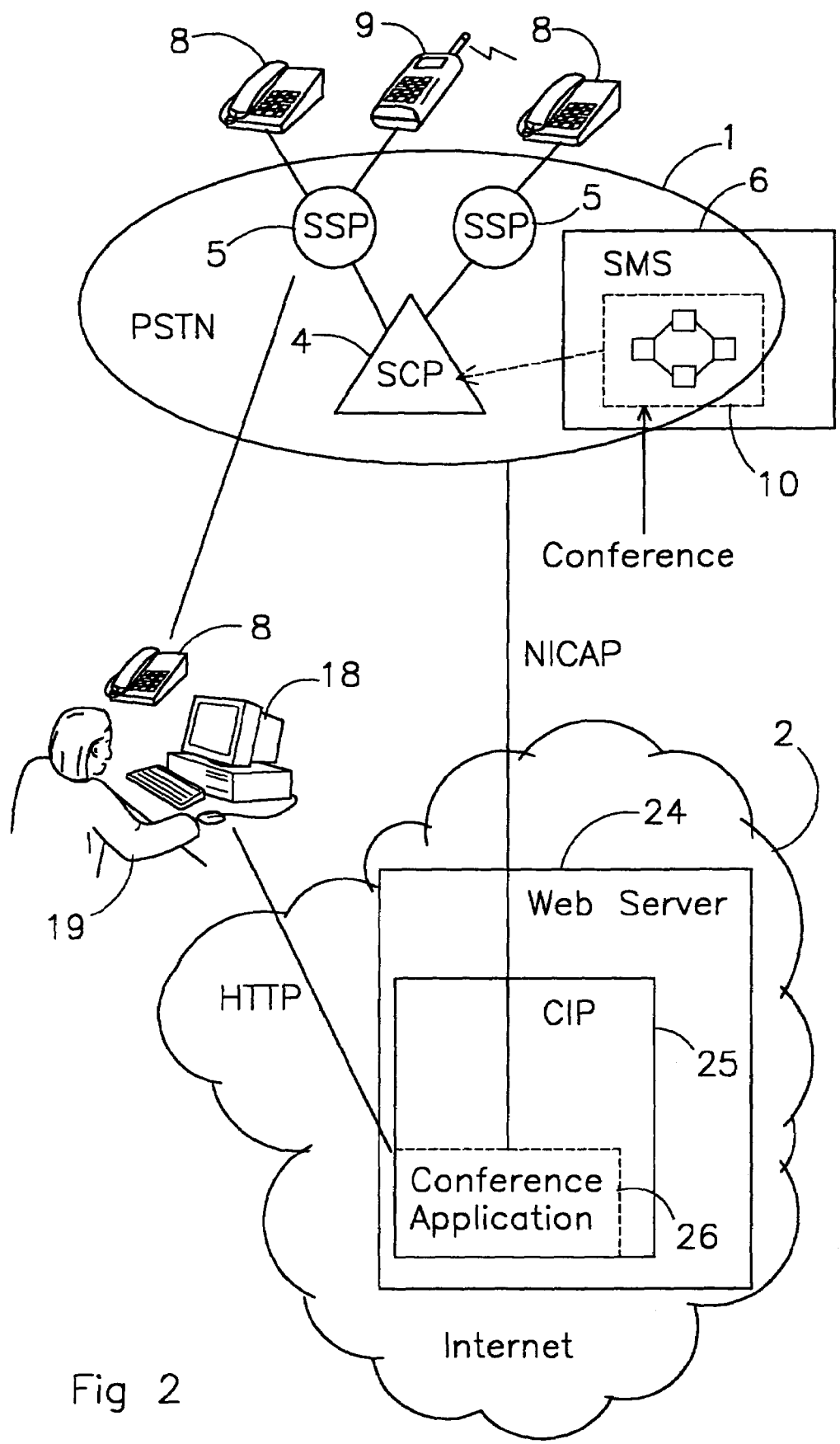

Other characteristics of the invention will be described in detail below with reference to the drawings, in which:

FIG. 1 shows a diagram of a first combination of the internet network and a telephone network according to the invention for setting up a telephone conference call; and FIG. 2 shows a diagram of a second combination of the internet network and a telephone network according to the invention for setting up a telephone conference call.

Firstly it is observed that the abbreviations and their meanings used hereinafter are known in the art.

The diagram of FIG. 1 shows a combination of a switched telephone network 1, in particular a Public Switched Telephone Network ("PSTN"), and a different type of communication network generally known as internet or web 2.

The switched telephone network 1 comprises in general one or more Service Control Points ("SCP") 4, one or more Service Switching Points ("SSP") 5 and a Service Management System ("SMS") 6.

The service control point 4, also called signal control point, is a remote database within a System Signalling 7 ("SS7") network and it supplies the translation and routing data needed to deliver advanced network services. The service control point 4 may use scripts provided by the service management system 6 to set up telephone connections between telephone devices, such as 8 and 9, through one or more service switching points 5. Such scripts are also called Intelligent Network ("IN") scripts. One of such scripts may be a script 10 for setting up a conference call between telephone devices 8, 9 according to the invention, which will be described hereinafter.

The internet 2 comprises a plurality of web servers 15, one of which is shown. The web server 15 has an Internet Provider ("IP") port by which it connects to an Internet Gateway ("ING") 16. The internet gateway 16 is, for the purpose of the invention, connected to a service control point 4 of the switched telephone network 1 and communicates with the service control point in compliance with the Signalling System 7.

In addition the web server 19 is directly or with other web servers in between connected to a plurality of web client terminals, such as web client terminal 18. An operator 19 of the web client terminal 18 who wants to set up a telephone conference call may do so from any place with an internet connection, whether the operator wants to participate in the conference call (through a telephone device 8, not through the web client terminal 18) or not.

Although the same physical connections may be used in the telephone network 1 and the internet 2 communication with in each network is very different. Apart from setting up and breaking a connection there is no communication between the switched telephone network 1 and telephone devices 8, 9 to which it is connected. To the contrary, with the internet 2 communication takes place between computers, in particular a server program on a web server 15 and a browser on a web client terminal 18 by using the Hyper Text Transfer Protocol ("HTTP").

Communication of speech between operators 19 of different web client terminals is known per se but takes place completely within the internet 2 and said terminals 18. Because of the very different type of communication with respect to the telephone network 1 such communication of speech through the internet 2 has a poor quality and is by far insufficient to build a conference call through the internet with.

According to the invention, upon request by the operator 19 via his web client terminal 18 the web server 15 calls a conference application 21, with serves the web client terminal 18 with a web page by which the operator 19 may input telephone numbers of telephone devices 8, 9 for which he wants to set up a telephone conference call. Set web page needs only to comprise boxes which he can fill out with the telephone numbers of wanted participants of the conference call and a "send" or "submit" button to upload his input to the conference application 21 of the web server 15. As a result thereof, the conference application 21 will upload the plurality of telephone numbers received from the web client terminal 18 to the service control point 4 of the telephone network 1 through a mediator 22, which serves to interface with the Internet Gateway 16 and which may comprise an Application Programming Interface ("API").

Upon receipt of the plurality of telephone numbers uploaded by the web server 15 the service control point 4 invokes the intelligent network conference script 10 in the service management system 6. This script, as proposed by the invention, is used to connect the telephone devices 8, 9 of the plurality of telephone numbers by instructing the service control point 4 to do so. Apart from this basical function the script 10 may be more complex, dependent on requirements on charging, statistics and what to do if one of the parties is not answering or finishes.

Once the conference call has been set up by the operator 19 he may terminate the communication between his terminal 18 and the web server 15. On the other hand, he could maintain the communication between his terminal 18 and the web server 15 for charging purposes, for which another application at the web server 15 could be used. Authentication and charging may also be carried out by a Remote Authentication Dial In User Service ("RADIUS") protocol, the use of which is known per se within the internet.

The diagram of FIG. 2 differs from the diagram of FIG. 1 by that the web server 15 is replaced by the web server 24 which connects to the service control point 4 of the switched telephone network 1 by using the Network Intelligence Communication Application Protocol ("NICAP"). Therefore, the web server 24 may comprise the Customer Interaction Platform ("CIP") 25, which is a layered platform, comprising a communication layer, an application layer, a resource layer and a media control layer. The conference application 26, in stead of conference application 21 of FIG. 1, can than be build in the application layer of the CIP 25 and may use components of the resource and media control layers of the CIP 25.

By using the web server 24, which incorporates the customer interaction platform 25, at least part thereof providing the conference application 26, it is not only possible to upload data, in particular the plurality of telephone numbers, to the intelligent network conference script 10 of the switched telephone network 1, but also to download data, in particular information on the states of telephone connections, to the web server 24 and from the web server 24 to the web client terminal 18.

Although with the system according to FIG. 2 the web client can be served with more capabilities than within the system according to FIG. 1, the customer interaction platform 25 is more complex than the conference application 21 and the mediator 22 of the system of FIG. 1, and NICAP is company proprietary, which may hinder adoption thereof by other companies.

The method according to the invention as described with reference to the FIGS. 1, 2 provides a very easy, quick and cheap way to set up a telephone conference call between telephone devices 8, 9 of, or connected to a (public) switched telephone network through the internet.

The invention claimed is:

1. Method for setting up connections between a plurality of telephone devices (8, 9) of a switched telephone network (1), for establishing a conference call, comprising:
   a) setting up an internet (2) communication from a web client terminal (18) to a web server (15, 24);
   b) on request by the web client terminal (18) to the web server (15, 24) serving the client terminal (18) with a conference application (21, 26);
   c) by using the conference application (21, 26) providing a plurality of telephone numbers corresponding to respective ones of the plurality of telephone devices (8, 9) from the web client terminal (18) to the web server (15, 24);
   d) setting up a communication from the web server (15, 24) to a service control point (4) of the switched telephone network (1);
   e) providing the plurality of telephone numbers from the web server (15, 24) to the service control point (4);
   f) at the service control point (4), on receiving the plurality of telephone numbers from the web server (15, 24), initiating an Intelligent Network (IN) script (10);
   g) by executing the script (10) by the service control point (4) setting up telephone connections between the plurality of telephone devices (8, 9).

2. Method according to claim 1, characterized in that for the communication the Internet Gateway ("ING") (16) is used.

3. Method according to claim 1, characterized in that the conference application (21) communicates with the service control point (4) through an ING mediator (22).

4. Method according to claim 1, characterized in that for the communication the Network Intelligence Communication Application Protocol ("NICAP") is used.

5. Method according to claim 1, characterized in that the conference application (26) communicates with the service control point (4) through a NICAP mediator (26).

6. Method according to claim 5, characterized in that the NICAP mediator (26) is provided by a Customer Interaction Platform (CIP) (25).

7. Method according to any of the claims 4–6, characterized in that the conference application (26) and the script (10) allow to change the plurality of telephone numbers from the web client terminal (18) to set up additional or to break existing telephone connections.

8. System for setting up connections between a plurality of telephone devices (8, 9) of a switched telephone network (1) having a service control point (4), which is suitable for setting up a telephone connection between telephone devices, comprising a web client terminal (18) and a web server (15, 24), which is connected to the client terminal (18) and the telephone network (1), in which the web client terminal (18) may carry out a conference call set up application supported by the web server (15, 24) for submitting telephone numbers of respective telephone devices (8, 9) to the web server (15, 24), the web server (15, 24) forwards the telephone numbers to the service control point (4) of the telephone network (1), and the service control point (4) carries out a dedicated Intelligent Network (IN) script (10) for setting up telephone connections between telephone devices having the telephone numbers submitted to the web server (18).

* * * * *